United States Patent [19]
Cordery et al.

[11] Patent Number: 6,073,125
[45] Date of Patent: Jun. 6, 2000

[54] TOKEN KEY DISTRIBUTION SYSTEM CONTROLLED ACCEPTANCE MAIL PAYMENT AND EVIDENCING SYSTEM

[75] Inventors: Robert A. Cordery, Danbury; Leon A. Pintsov, West Hartford, both of Conn.

[73] Assignee: Pitney Bowes Inc., Stamford, Conn.

[21] Appl. No.: 08/883,413

[22] Filed: Jun. 26, 1997

[51] Int. Cl.[7] .................................................. G06F 17/60
[52] U.S. Cl. ........................... 705/60; 705/400; 705/401; 705/402; 705/403; 705/408; 705/1; 705/51; 705/63; 705/64
[58] Field of Search .................................. 705/401, 400, 705/402, 403, 408, 1, 7, 8, 9, 11, 60, 63, 64, 51; 395/108; 364/468.13, 468.14, 468.22, 488, 489; 380/30

[56] References Cited

U.S. PATENT DOCUMENTS

| | | | |
|---|---|---|---|
| 4,757,537 | 7/1988 | Edelmann et al. | 380/51 |
| 4,775,246 | 10/1988 | Edelmann et al. | 380/23 |
| 4,831,555 | 5/1989 | Sansone et al. | 364/519 |
| 4,853,961 | 8/1989 | Pastor | 380/21 |
| 4,876,716 | 10/1989 | Okamoto | 380/21 |
| 4,935,961 | 6/1990 | Gargiulo et al. | 380/21 |
| 5,448,641 | 9/1995 | Pintsov et al. | 380/51 |
| 5,454,038 | 9/1995 | Cordery et al. | 380/23 |
| 5,606,613 | 2/1997 | Lee et al. | 380/21 |

*Primary Examiner*—James P. Trammell
*Assistant Examiner*—Chinor M. Lee
*Attorney, Agent, or Firm*—Charles R. Malandra, Jr.; Michael E. Melton; David E. Pitchenik

[57] ABSTRACT

A method for controlled acceptance mail accounting and evidencing, includes creating a mail batch including at least one mail piece having an encrypted indicia printed thereon. The encrypted indicia is generated by the use of a key $K_m$. A statement of mailing file is created containing data related to the mail batch. The statement of mailing file including the key $K_m$ is encrypted with a public key of an authentication unit of a carrier distribution system. The public key has an associated private key. The mail batch and the statement of mailing file is submitted to the carrier distribution system and the mail batch and the mail documentation file is processed using the private key of the authentication unit of the carrier distribution system to decrypt the encrypted information and recover the $K_m$. The key $K_m$ is then used in an authentication procedure related to the mail batch. The statement of mailing file may be sent in tangible form or in electronic form to the carrier distribution system. A plurality of public keys of a plurality of authentication units may be available for encryption of the statement of mailing file including the key $K_m$. The encryption process may be implemented separately with different public keys of different authentication units when it is not yet determined which authentication unit will perform the processing. This provides greater flexibility in the selection of the authentication unit to process the mail and achieve systems efficiency.

21 Claims, 3 Drawing Sheets

| SOM 00001 | MAILER ID 1234 | VAULT ID 1234567 | PIECE COUNT 0001 TO 01410 | MAILER ACCOUNT 775532 |
|---|---|---|---|---|
| DATE 11 APRIL, 95 | RATING TABLE 987654 | SIGNATURE 01234567 | ERROR CONTROL 001234321 | $(K_m) P_{AV}$ 012106789 |
| WEIGHT (OZ) | SIZE | DISCOUNT | POSTAGE | NUMBER OF PIECES |
| 0.5 | STANDARD | FULL | $0.32 | 731 |
| 1.0 | SURCHARGE | NON-PRESORT | $0.55 | 27 |
| 1.7 | STANDARD | PRE-BARCODED | $0.57 | 567 |
| 1.8 | SURCHARGE | PRESORT | $0.75 | 85 |
| 94.34 LB | AUTHENTICATION UNIT ID 123579 TOTALS | | $635.71 | 1410 |

TOKEN KEY DISTRIBUTION SYSTEM CONTROLLED ACCEPTANCE MAIL PAYMENT AND EVIDENCING SYSTEM

FIELD OF THE INVENTION

The present invention pertains to mail payment and evidencing systems and, more particularly, to a token key distribution system for mail payment and evidencing system which is adapted to be employed with a batch of mail prepared by a mailer and processed by a carrier as part of the mail distribution process.

BACKGROUND OF THE INVENTION

Various controlled acceptance mailing systems have been developed such as those disclosed in U.S. patent application Ser. No. 432,733 filed May 2, 1995, for Cordery and Pintsov, entitled CONTROLLED ACCEPTANCE MAIL PAYMENT AND EVIDENCING SYSTEM, now U.S. Pat. No. 5,675,650 Additionally, other controlled acceptance systems have been developed such as those shown in U.S. patent application Ser. No. 665,268 filed Jun. 17, 1996, for Cordery and Pintsov and Weiant, now entitled CONTROLLED ACCEPTANCE MAIL SYSTEM SECURELY ENABLING REUSE OF DIGITAL TOKEN INITIALLY GENERATED FOR A MAIL PIECE ON A SUBSEQUENTLY PREPARED DIFFERENCE MAIL PIECE TO AUTHENTICATE PAYMENT OF POSTAGE, now U.S. Pat. No. 5,768,132. The entire disclosure of these two patent applications and the issued patent are hereby incorporated by reference. Various methods for handling cryptographic key are disclosed in U.S. Pat. No. 4,935,961, for METHOD AND APPARATUS FOR GENERATION AND SYNCHRONIZATION OF CRYPTOGRAPHIC KEYS and in U.S. Pat. No. 4,853,961 for RELIABLE AUTHENTICATION SYSTEM.

In controlled acceptance systems, batches of mail are brought to a carrier service such as a postal carrier service for mail processing. The mail is brought along with a statement of mailing to tie the batch of mail together with a document used by the carrier service to help verify payment of postage or carrier for the batch of mail.

The controlled acceptance systems may involve the printing of encrypted indicias. The encrypted indicias can employ a digital token. The digital token is encrypted data that authenticates the value and other information printed on the mail piece. Examples of systems for generating and using digital tokens are described in U.S. Pat. No. 4,757,537 for SYSTEM FOR DETECTING UNACCOUNTED FOR PRINTING IN A VALUE PRINTING SYSTEM; U.S. Pat. No. 4,831,555 for UNSECURED POSTAGE APPLYING SYSTEM; and U.S. Pat. No. 4,775,246 for SYSTEM FOR DETECTING UNACCOUNTED FOR PRINTING IN A VALUE PRINTING SYSTEM. Because the digital token incorporates encrypted data including postage value, altering of the printed postage revenue and the postage revenue block is detectable by a standard verification procedure.

SUMMARY OF THE INVENTION

It has been discovered that an improved key management system can be implemented for controlled acceptance mail which utilizes existing communications channels between the mailer and the carrier service.

It is an object of the present invention to provide a key management system which minimizes the complexity of determining the appropriate key to be utilized in verifying a batch of mail and thereby reduced the overall cost of the system.

It is a further objective of the present invention to provide enhanced security by facilitating the use of changing encryption keys employed in generating each batch of mail.

A method for controlled mail acceptance and evidencing embodying the present invention, includes creating a mail batch having at least one mail piece having an encrypted indicia printed thereon. The encrypted indicia is generated by the use of a key $K_m$. A statement of mailing file is created containing data related to the mail batch. The statement of mailing file includes the key $K_m$ encrypted with a public key of an authentication unit of a carrier distribution system. The public key has an associated private key. The mail batch and said statement of mailing file is submitted to the carrier distribution system and the mail batch and the mail documentation file is processed using the private key of the authentication unit of the carrier distribution system to decrypt the encrypted information and recover the $K_m$. The key $K_m$ is then used in an authentication procedure related to said mail batch.

In accordance with a feature of the present invention, the key, $K_m$, may be a randomly changing key. The key $K_m$ may be changed every time a new batch of mail is created. The key change may also be related to a predetermine time period or changed in a random time period, the random time period being generated by the system secure device or vault. Combinations of the foregoing may be implemented.

In accordance with yet another feature of the present invention, the statement of mailing file may be sent in tangible form and/or in electronic form to the carrier distribution system.

BRIEF DESCRIPTION OF THE DRAWINGS

Reference is now made to the following figures wherein like reference numerals designate similar elements in the various fuse and which.

DETAILED DESCRIPTION OF THE PREFERRED EMBODIMENT

General Overview

Figure 1:
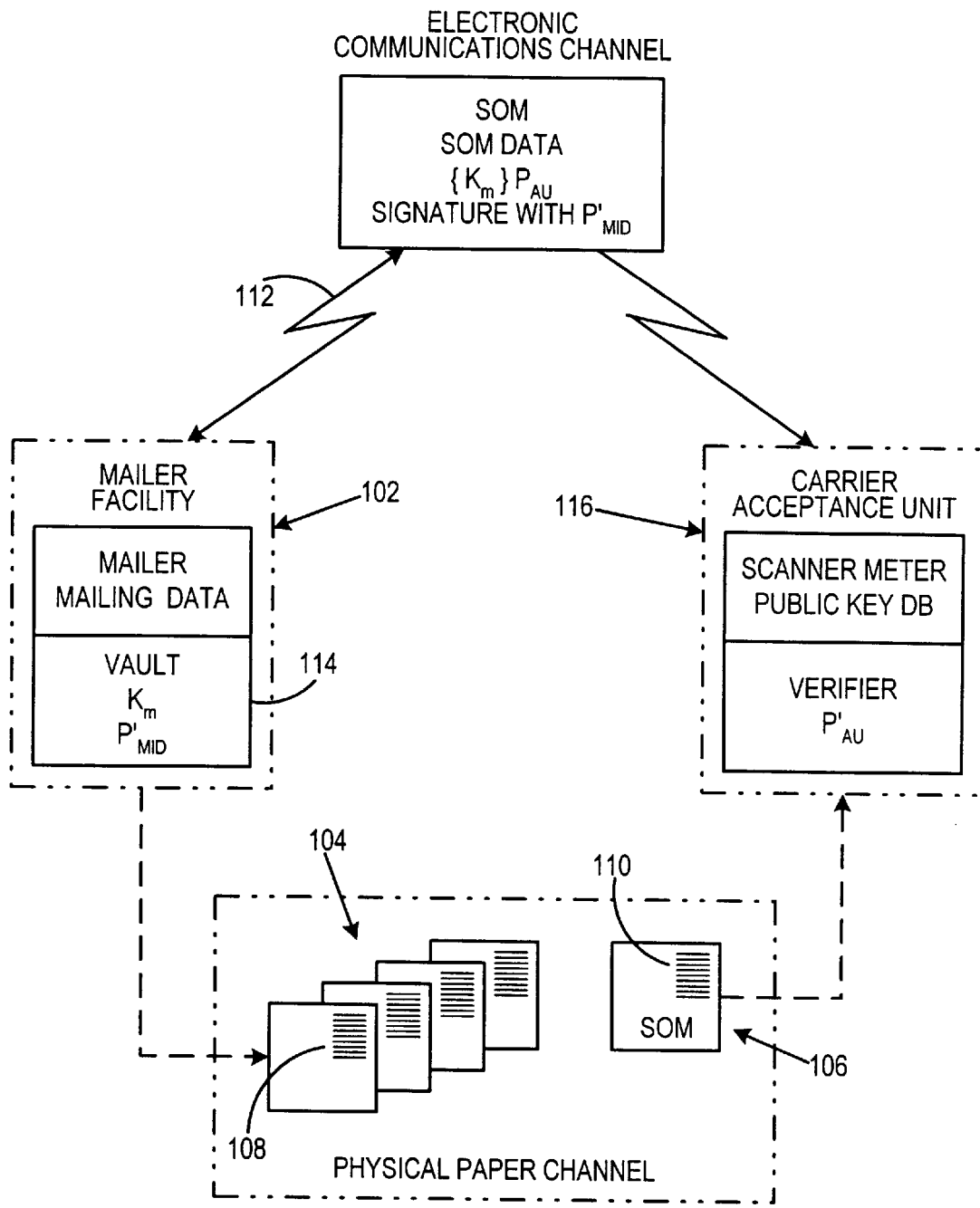
FIG. 1 is a block diagram of the system components of a controlled acceptance mail system embodying the present invention.

Digital tokens provide a basis for verifying payment for an indicium through use of a secret key. Secret key management for the digital indicium involves a risk of exposure of the key to an attacker. The attacker could then use the discovered key to produce counterfeit indicia. Measures, including secure hardware for the verifier, distribution of time-dependent token keys, and use of two independent authorities, limit this threat. Bulk acceptance mail accompanied by a statement of mailing provides another opportunity to limit the threat of counterfeit indicias. The mailer and acceptance unit can jointly create keys for a particular mailing, valid one time only, or for a very limited time, at a particular bulk acceptance unit. The reduced utility of discovering these keys allows simplified key management.

The vendor of mailing equipment and postal service (or another carrier) perform different roles in the process. The vendor may help distribute data to the mailer. The postal service data center may help distribute data to the acceptance unit verifiers.

The system may involve the process of initialization, generation of statement of mailing, and verification of statement of mailing. During the initialization process, the vault manufacturer generates a set of asymmetric-key pairs indexed by meter identification number MID:

$$\{(P_{MID}, P'_{MID}: MID)\}$$

Here "'" denotes the private key of the pair. The manufacturer installs the appropriate key pair in each meter. The postal service distributes the meter public keys to the appropriate acceptance units. Each acceptance unit verifier generates a acceptance unit key pair, indexed by a acceptance unit number AU:

$$(P_{AU}, P'_{AU}: AU)$$

The vault manufacturer (vendor) provides a distribution service for acceptance unit keys.

The mailer generates a mailing together with a statement of mailing. This involves the vault generating a digital token key $K_m$ which may be a random key. The mailing consists of mailpieces imprinted with digital tokens generated by using $K_m$. The mailer also generates the mailing data for the statement of mailing and the vault encrypts $K_m$ with $P_{AU}$ (public key of the AU pair) and appends the encrypted key to the mailing data and includes this in the statement of mailing data. The mailer then signs the statement of mailing data (mailing data+encrypted token key) with $P'_{MID}$. (The private key of the mailers pair).

During the verification process, the acceptance unit receives and processes the statement of mailing (SOM) and the mailing itself. The acceptance unit retrieves MID from SOM and uses MID as a pointer to look-up $P_{MID}$ in the acceptance units database and verifies the SOM signature.

The acceptance unit uses $P'_{AU}$ to decrypt $K_m$ from the statement of mailing and thereafter verifies the indicias with $K_m$. The acceptance unit may send sample of indicia data for vendor verification. This may be part of a normal verification process.

System Organization and Operation

Reference is now made to FIG. 1. A batch of mail is prepared at a mailer facility 102. The batch of mail includes one or more mail pieces shown generally at 104 and an associated statement of mailing 106. Each of the mail pieces 104 includes information 108 printed thereon. This information includes an encrypted indicia, such as one containing a digital token. This information may be printed in alpha numeric format, any form of bar code, any combination of alpha numeric and bar code or any symbol or other type of data representation which incorporates the necessary information to provide the required encrypted and non-encrypted information. The statement of mailing, likewise, may have information printed thereon which may be alpha numeric and/or bar code information or combination thereof. The bar code imprinting facilitates the recovery of information from the statement of mailing at the carrier acceptance unit facility 110. The statement of mailing may be presented (sent) in any tangible form. For example, the statement of mailing may be in hard copy form, floppy disc form, smart card form or any other suitable form.

The statement of mailing 106 may also be sent from the mailer facility to the carrier acceptance unit electronically as is shown generally at 112. The mailer facility, as will be explained in greater detail hereinafter, includes equipment employed to generate the batch of mail. This batch of mail may be generated on an inserter, mailing machine or other equipment suitable to generate various mail pieces which are to be delivered to a carrier service for carrier distribution processing along with the statement of the mailing.

A secure device or vault is shown at 114. This secure device or vault may be a postage security device (PSD) proposed by the United States Postal Service in draft specifications, specifically: Information Based Indicium Program (IBIP) Indicium Specification dated Jun. 13, 1996; Information Based Indicia Program Postal Security Device Specification dated Jun. 13, 1996; and, Host Specification dated Oct. 9, 1996.

The vault stores a key $K_m$ which is used to generate the encrypted information printed on the mail pieces. This key $K_m$ may be changed for every different batch of mail created at the mailer's facility. The key may additionally be time dependent, and periodically changing with time. An additional key, $P'_{MID}$, the private key of the vault is also stored in the vault. This is a private key indexed by the unique vault identity. At the carrier acceptance unit 116, an acceptance unit scanner and meter public key identity data base are maintained. This facility also includes a verifier which securely stores $P'_{AU}$, the private key of the carrier acceptance unit.

It should be noted that the key $K_m$ for the system shown in FIG. 1 would be a secret key in a symmetric encryption system That is, the key $K_m$ would be the same secret key used in encryption and decryption process. However, public key systems may also be employed.

Figures 2, 3:
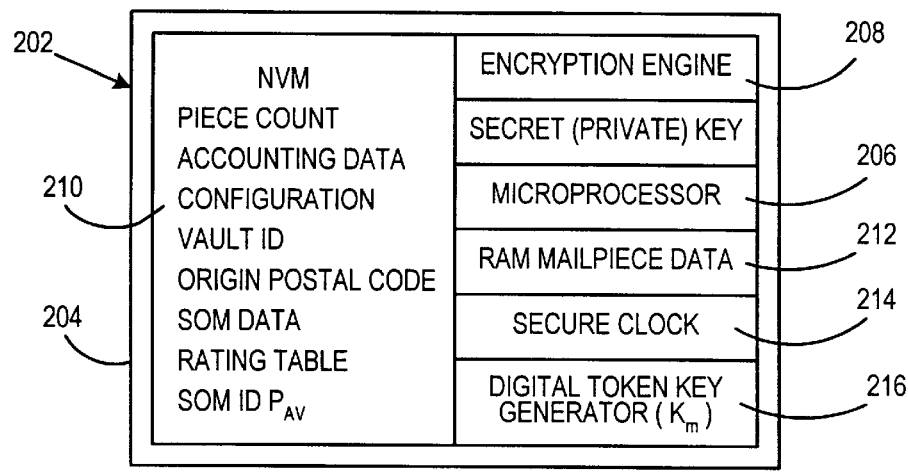
FIG. 2 is a block diagram showing greater detail of the vault elements including the encryption engine and certain keys employed in executing the digital token transformation to generate digital tokens imprinted on each mail piece, to generate information printed on the statement of mailing, to generate the encryption keys and to encrypt the encrypting key for communication to the acceptance unit.
FIG. 3 is an example of printed of a mail documentation file or statement of mailing.

Reference is now made to FIG. 2. Vault 202, (suitable for use as vault 114, shown in FIG. 1) includes a secure housing 204. Mounted within the secure housing is a micro processor 206 operatively connected to an encryption engine 208 executing the encryption algorithm and holding secret keys necessary to generate the encrypted indicia. A non-volatile memory 210 stores information related to generating the encrypted indicia and digital token including the non resettable piece count, accounting data, configuration data, vault identification, origin postal code, statement of mailing data, rating table, statement of mailing identification and the public key of the authenticating unit. It should be recognized that multiple public keys associated with different verification authenticating units may be stored within the vault for different authenticating services associated with a single carrier or different carrier services. This is because a mailer may deposit mail in different locations which would be processed by different authentication verification units and, additionally, a mailer may use various carrier services in sending mail to various recipients. Additionally, connected to the microprocessor is a random access memory 212 and, if desired, a secure clock 214.

The microprocessor is operatively connected to a digital token key generator 216. This digital token generator 216 generates a new digital token key $K_m$ utilized in computing the digital token for each separate batch mailing, as desired by the mailer, or as required by the system design of the mail systems. It should be noted that the digital token key generator 216, even though within the secure housing 202, may have further security provisions such as additional secure enclosures encapsulation or other security measures to render the digital token key generator inaccessible to unauthorized individuals. The organization and operation of the vault 202 depends on the particular system for encryption being implemented. Various organization of vault and vault related data are suitable for use with the present invention.

Reference is now made to FIG. 3. A printed statement of mailing file is shown at 302. This file is submitted to a carrier service with an associated batch of mail and plays a critical role in the acceptance procedure. The file 302 can be provided to the carrier service as a printed document, which may include bar code or other machine readable data thereon, electronically, on a storage medium or in multiple other forms.

The statement of mailing file includes statement of mail identification number 304, a mailer identification 306, a vault identification 308 and a mailer account 310, if desired. Each mailer may have several different accounts for use in different applications and each account may have several different vaults associated with it. The digital token key $K_m$ which is used to generate the encrypted indicia by the encryption engine 208 is provided at 312 in encrypted form. This key $K_m$ is encrypted with the public key $P_{AU}$ of the authentication unit. This is the key generated by digital token key generator 216 encrypted by encryption engine 208 using the public key $P_{AU}$ stored in the non volatile memory of the vault 202.

This encrypted key 312 in the statement of mailing 302 provides a convenient means for the authentication unit to recover the key $K_m$ needed to verify the indicias printed on the various mail pieces. This is achieved by decrypting the information shown at 312 using the private key $P'_{AU}$, of the authentication unit. It should be noted that a non-encrypted identification of the anticipated authentication unit which is expected to verify the mail pieces may be included in the statement of mailing. This is so that if the statement of mailing is inadvertently sent to the wrong authentication unit the receiving unit would recognize this and understand that the inability to decrypt the information at 312 is due to this error. Thus, the entire statement of mailing or portion of the statement of mailing may be encrypted with the public key of the authentication unit, if desired, so that only authorized holders of the authentication unit private key can decrypt the information. The non-encrypted authentication unit identification is shown in clear text at 314.

A piece count for the mail run is also provided at 316. In the particular run documented by the statement of mailing file 302, 1,410 mail pieces were produced for submission as the batch. Also provided as part of the statement of mail file is the date of submission at 318, the identification of the rating table employed at 320. It should be noted that the rating table identification may be a truncated encrypted hash-code of the rating table employed in a manner described in U.S. Pat. No. 5,448,641 for POSTAL RATING SYSTEM WITH VERIFIABLE INTEGRITY.

A digital signature of the entire statement of mailing file is provided at 322 and an error correction code at 324 to facilitate error detection and correction when machine reading the statement of mailing file.

The statement of mailing file further contains information for groups of mail pieces which are similar in weight, size, discount and postage. For example, on one line at 326, 731 mail pieces with postage value of 32 cents, the full current postage rate of the standard size mail piece in the United States, with an actual weight of 5/10 of an ounce are listed. Similarly, in the following entries various groups of mail pieces having similar weight, size, discount and postage are listed. The various totals, such as the total weight of the mail pieces in the batch are provided at 328 along with the total postage at 330 and the total number of mail pieces at 332.

The process of creating the statement of mail file 302 can be modified to create a mail tray documentation file and corresponding encrypted tray labels for trays and other containers that are used for mail packaging. In particular, during a mail generation process information needed for mail packaging is frequently available to an inserter or mailing machine.

Figure 4:
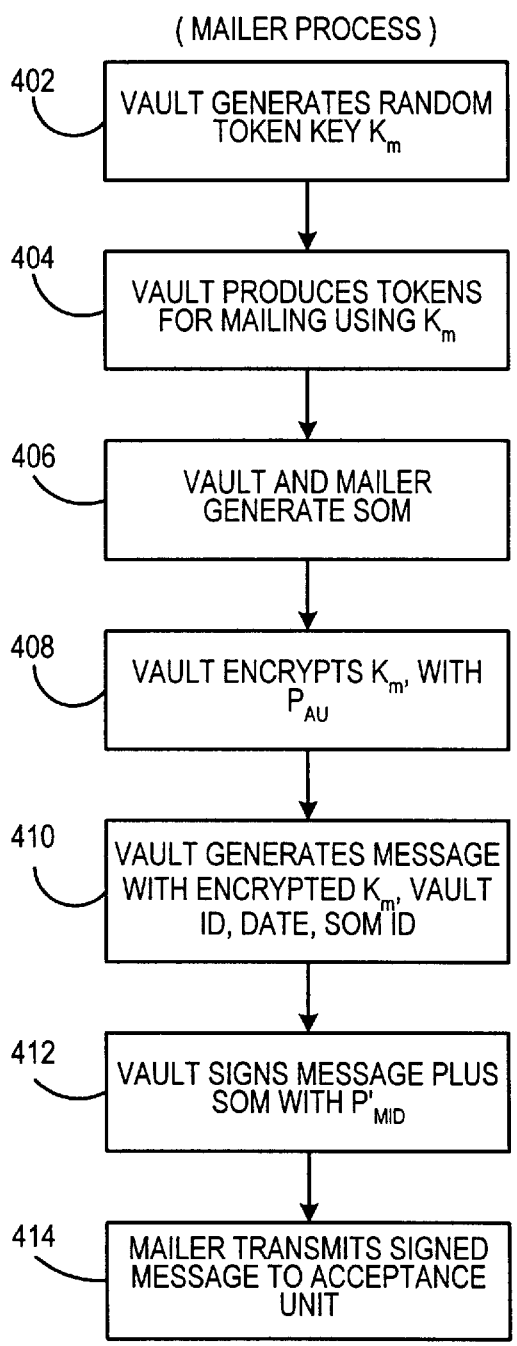
FIG. 4 is a flow chart of the process at the mailer facility useful in an understanding of the present invention.

Reference is now made to FIG. 4. The vault generates an encryption key such as a random token key $K_m$ at 402. The vault produces digital tokens for the encrypted indicia for mailing using key $K_m$ at 404. The vault and mailer generate the statement of mailing shown at 406. This statement of mailing has been shown and described in connection with FIG. 3. The vault encrypts $K_m$ with the public key $P'_{AU}$ of the authentication authority at 408. At 410, the vault generates a message with the encrypted key $K_m$, vault identification, submission date, statement of mailing identification. The vault signs this message plus the statement of mailing with the private key $P'_{MID}$ of the mailer at 412. The mailer then transmits the signed message to the acceptance unit together with the statement of mailing at 414. As noted before, this may be sent electronically, in hard copy form or by storage media type systems such as card, disc and the like.

Depending upon the size of the message and the particular techniques employed, the vault message plus the statement of mailing may be digitally signed by hashing the information and thereafter encrypting the result hash code. However, other digital encryption signature techniques are equally applicable to the present invention.

Figure 5:
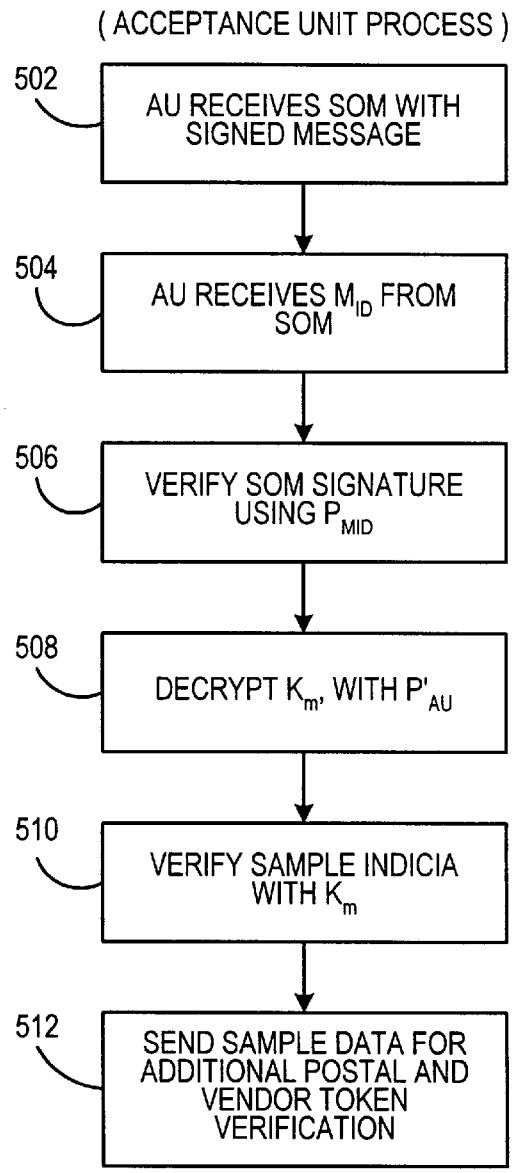
FIG. 5 is a flow chart of the process at the acceptance unit, also helpful in an understanding of the present invention.

Reference is now made to FIG. 5. The acceptance unit receives the statement of mailing with the signed message at 502. The authentication unit retrieves the mailer ID from the statement of mailing at 504 and verifies the statement of mailing signature at 506 using the public key of the mailer $P'_{MID}$. The authentication unit thereafter decrypts encrypted $K_m$ with the private key $P'_{AU}$ of the authentication unit at 508. The authentication unit using $K_m$ verifies the indicia of mail pieces selected for verification. This may be a sampling process such as shown at 510. Finally, if desired, a sample of the data obtained in 510 may be sent to another location or operation to audit the verification processor to detect any corrupt practices or incorrect procedures within the acceptance unit. This is shown at 512 where sample data is sent for additional postage and vendor token verification.

While the present invention has been disclosed and described with reference to the disclosed embodiments thereof, it will be apparent, as noted above, that variations and modifications may be made. It is, thus, intended in the following claims to cover each variation and modification that falls within the true spirit and scope of the present invention.

What is claimed is:

1. A method for controlled acceptance mail accounting and evidencing, comprising the steps:

creating a mail batch including at least one mail piece having an encrypted indicium printed thereon, the encrypted indicium being generated by a meter using a key $K_m$;

creating a statement of mailing containing data related to the mail batch, encrypting the key $K_m$ with a public key $P_{AU}$ of an authentication unit of a carrier distribution system, the public key $P_{AU}$ having an associated private key $P'_{AU}$;

signing with a private key $P_M$ of the meter a file consisting of at least the statement of mailing with the encrypted key $K_m$ appended thereto, the private key $P_M$ having an associated public key $P'_M$;

submitting the mail batch and the statement of mailing to the carrier distribution system; and, verifying the signature of the file using the meter public key $P_M$;

decrypting the encrypted key $K_M$ using the authentication unit private key $P'_{AU}$; and using the key $K_m$ to verify each indicium of each mail piece in the mail batch.

2. A method for controlled acceptance mail accounting and evidencing as defined in claim 1 said key, $K_m$, is a randomly changing key.

3. A method for controlled acceptance mail accounting and evidencing as defined in claim 2 wherein said key $K_m$ is changed every time a new batch of mail is created.

4. A method for controlled acceptance mail accounting and evidencing as defined in claim 2 wherein said key $K_m$ is changed every predetermine time period.

5. A method for controlled acceptance mail accounting and evidencing as defined in claim 4 wherein said predetermine time period is such that the key $K_m$ is changed during a succeeding day.

6. A method for controlled acceptance mail accounting and evidencing as defined in claim 5 wherein said predetermine time period is such that the key $K_m$ is changed during each succeeding day, whether or not the system is operated.

7. A method for controlled acceptance mail accounting and evidencing as defined in claim 5 wherein said predetermine time period is such that the key $K_m$ is changed during each succeeding day the system is operated.

8. A method for controlled acceptance mail accounting and evidencing as defined in claim 2 wherein said key $K_m$ is changed in a randomly generated time period.

9. A method for controlled acceptance mail accounting and evidencing as defined in claim 8 wherein said randomly generated time period is generated by a secure device at a mailer facility.

10. A method for controlled acceptance mail accounting and evidencing as defined in claim 2 wherein said key $K_m$ is changed every time a new batch of mail is created and every predetermine time period.

11. A method for controlled acceptance mail accounting and evidencing as defined in claim 2 wherein said key $K_m$ is changed every time a new batch of mail is created and in a randomly generated time period.

12. A method for controlled acceptance mail accounting and evidencing as defined in claim 2 wherein said statement of mailing file is presented in tangible form to said carrier distribution system.

13. A method for controlled acceptance mail accounting and evidencing as defined in claim 2 wherein said statement of mailing file is sent in electronic form to said carrier distribution system.

14. A method for controlled acceptance mail accounting and evidencing as defined in claim 12 wherein said tangible form statement of mailing file is a printed copy of said statement of mailing file.

15. A method for controlled acceptance mail accounting and evidencing as defined in claim 12 wherein said tangible form statement of mailing file is a portable electronic storage means containing a copy of said statement of mailing file.

16. A method for controlled acceptance mail accounting and evidencing as defined in claim 2 wherein said key $K_m$ is changed every time a new batch of mail is created and during a time period and wherein statement of mailing file is sent in both tangible form and in electronic form to said carrier distribution system.

17. A method for controlled acceptance mail accounting and evidencing as defined in claim 1 wherein a plurality of public keys of plurality of an authentication units are available for use in encrypting said key $K_m$.

18. A method for controlled acceptance mail accounting and evidencing as defined in claim 17 wherein said key $K_m$ is encrypted with a selected one of said plurality of said public keys of said plurality of authentication units, said selected public key being the public key of the authentication unit which processes said mail batch and said mail documentation file.

19. A method for controlled acceptance mail accounting and evidencing as defined in claim 18 wherein said plurality of authentication units are associated with a plurality of carrier distribution systems.

20. A method for controlled acceptance mail accounting and evidencing as defined in claim 17 wherein said statement of mailing file including said key $K_m$ is separately encrypted with a first public key of a first authentication unit and separately encrypted with a second public key of a second authentication unit.

21. A method for controlled acceptance mail accounting and evidencing as defined in claim 17 wherein said statement of mailing file including said key $K_m$ is separately encrypted with a plurality of public keys of a plurality of authentication units such that any of said plurality of authentication units using the associated private key of said authentication unit may process said encrypted statement of mailing file.

* * * * *